2,895,938
Patented July 21, 1959

2,895,938

COPOLYMERIZATION OF A STYRENE AND ACRYLONITRILE IN THE PRESENCE OF AN ORGANIC SOLVENT HAVING AT LEAST ONE HYDROXYL GROUP

Helmut Ohlinger, Ludwigshafen (Rhine), Oppau, and Rolf Fricker, Ludwigshafen (Rhine), Germany, assignors to Badische Anilin- & Soda-Fabrik Aktiengesellschaft, Ludwigshafen (Rhine), Germany No Drawing. Application November 15, 1955
Serial No. 547,015

Claims priority, application Germany November 24, 1954

8 Claims. (Cl. 260—45.5)

This invention relates to an improved method for the production of copolymers from a styrene and acrylonitrile. More specifically, the invention deals with the copolymerization of a styrene and acrylonitrile in the presence of a liquid diluent.

Copolymers of styrene and acrylonitrile have technical interest by reason of their relatively high softening point, their impact strength, hardness and stability to solvents. Such copolymers, for example of 70 parts of styrene and 30 parts of acrylonitrile, are often prepared by emulsion polymerization. Transparent copolymers are, however, not thereby obtained but cloudy copolymers. Styrene and acrylonitrile may also be polymerized in mass. By reason of the relatively low boiling point of acrylonitrile, however, it is only possible to polymerize at moderately elevated temperatures. Consequently long polymerization periods are necessary and very high molecular weight products are obtained which can only be worked up with difficulty. In this case clear, transparent copolymers can only be prepared when the monomer mixture contains about 25 to 30% of acrylonitrile. Copolymers which contain less than 25% and more than 30% of acrylonitrile are, on the contrary, cloudy. Furthermore it is difficult to avoid undesirable rises in temperature in mass polymerization. In suspension polymerization in aqueous medium it is true that the temperature can better be kept constant, but the reaction in this case, by reason of the considerable water-solubility of the acrylonitrile, leads to copolymers of little uniformity partly consisting of beads and partly of flocks.

Accordingly it is an object of the present invention to avoid the above-mentioned disadvantages and to provide an improved method for the production of homogeneous and transparent copolymers of a styrene and acrylonitrile.

A further object is to provide a method of copolymerizing a styrene and acrylonitrile in the presence of a liquid diluent.

Another object is the copolymerization of the said monomers within certain limits in the presence of a liquid solvent containing hydroxyl groups.

Further objects of the invention may be seen in the following more detailed description.

According to the present invention these objects are achieved by preparing a homogeneous solution from 50 to 90% by weight of a styrene and 50 to 10% by weight of acrylonitrile in an organic solvent containing at least one hydroxyl group, which solvent is miscible with water, with the addition of a protective colloid, and copolymerizing the styrene and the acrylonitrile while agitating the solution. During the progress of the polymerization, the copolymer which is not soluble in the solvent containing hydroxyl groups separates out in the form of small spherical or spheroidal structures or particles which as a rule have a diameter between 0.02 and 1.0 millimetre.

Examples of styrenes which can be copolymerized with acrylonitrile in accordance with the present invention are styrene itself, alpha-methylstyrene, alpha-chlorostyrene and the various isomers of nuclear-methylated styrenes. Two or more of these styrenes may also be copolymerized at the same time with the acrylonitrile.

Whereas hitherto, in order to obtain homogenous or unitary copolymers it has been necessary to add the more rapidly polymerizing styrene in small batches at intervals to the more slowly polymerizing acrylonitrile, it is possible according to the present invention to obtain entirely uniform transparent copolymers of the composition of the initial mixture without it being necessary to employ precautionary measures of the said kind. Consequently the two monomeric compounds can be first mixed and then dissolved in the organic solvent or the two monomers can be supplied separately to the solvent. The total amount of the monomers can be dissolved in the solvent at the beginning of the polymerization; it is also possible however to have only a part of the two monomers present at the start and to replenish the two monomers in the reaction mixture at the rate at which the polymerization proceeds. The copolymerization of mixtures which contain 60 to 80% of a styrene and 40 to 20% of acrylonitrile, with reference to the total weight of polymerizable substances, is of particular interest.

As organic solvents containing at least one hydroxyl group there may be used for example methanol, ethanol, propanol, isopropanol, the various butanols, ethylene glycol, propylene glycols, butylene glycols and glycerine. As this summary shows, monohydric or polyhydric saturated aliphatic alcohols with 1 to 4 carbon atoms, which have at least a limited solubility or miscibility with water and in which the formed copolymers are insoluble, are good diluents. Preferably the reaction mixture should not contain more than 50% of polymerizable constituents. As a rule solutions are used which contain about 30 to 40% of monomers but it is possible to carry out the polymerization with considerably lower monomer concentrations, as for example with a monomer concentration of 5%.

Suitable protective colloids which act as suspension solubilizers or granulating agents for the suspension of the formed copolymers are organic high molecular weight compounds which are soluble in the solvents containing hydroxyl groups. Such protective colloids are homopolymers and copolymers of monoethylenically unsaturated monomers such as N-vinyl-pyrrolidone-2, acrylamide, methacrylamide, acrylic acid esters, vinyl alkyl ethers, copolymers of styrene and maleic anhydride and any other organic high molecular weight protective colloid or suspension stabilizer soluble in the liquid diluents used in accordance with this invention. Homopolymers and copolymers of vinyl methyl ether and vinyl ethyl ether and other vinyl alkyl ethers of short-chained saturated aliphatic alcohols have proved especially suitable. As a rule from 0.05 to 2%, preferably 0.1 to 0.5%, by weight of the protective colloid with reference to the total weight of polymerizable constituents are used. These protective colloids are film-forming high molecular weight compounds which as a rule have K-values according to Fikentscher of between 30 and 100. The K-value is a parameter which indicates the molecular weight of a high molecular weight compound (H. Fikentscher, "Cellulosechemie," 13 (1932), 58).

The copolymerization of the two monomer can be initiated purely thermally by heating the reaction mixture, preferably to temperatures between 50° and 80° C., but it is advantageous to add radical-forming polymerization catalysts to accelerate the reaction. Suitable radical-forming polymerization catalysts are for example organic peroxides, such as benzoyl peroxide, para-chlorobenzoyl peroxide, cyclohexanone peroxide, lauroyl peroxide, di-tertiary-butyl peroxide, di-tertiary-butyl hydroperoxide and other organic peroxides which are soluble in the organic solvents containing hydroxyl groups and the monomers to be polymerized. Azo compounds, such as azo-isobutyronitrile, are also effective radical-forming polymerization catalysts. Another good polymerization catalyst is hydrogen peroxide. In general about 0.05 to 2% of the polymerization catalysts are used with reference to the weight of the polymerizable compounds.

It is possible to effect the polymerization either below or at the boiling point of the solvent containing hydroxyl groups or also at higher temperatures when working under pressure. It is preferable to stir the reaction mixture continuously or to keep it in continuous movement by agitation, shaking or vibration. In order to avoid any discoloration of the product it is advantageous to effect the polymerization beneath the atmosphere of an inert gas, as for example under nitrogen.

One of the essential features of the present invention is the fact that the initial reaction mixture is not—as otherwise customary—an emulsion or suspension, stabilized with emulsifiers or dispersing agents, of the monomeric compounds in the diluent, but a completely homogeneous, transparent solution. This character of the initial mixture is maintained as long as the whole is kept free from water as far as possible. A water content up to 20% with reference to the diluent, as for example methanol, is permissible, but in the presence of water there is a tendency for undesirable yellow coloration of the polymers. Above the said water concentration, whitish cloudy initial mixtures are obtained because the water-insoluble styrene is precipitated. Moreover homogeneous completely transparent copolymers are no longer obtained therefrom because the acrylonitrile, which has appreciable water-solubility, is withdrawn from the copolymerization system.

The following examples will further illustrate this invention but the invention is not restricted to these examples. The parts are parts by weight.

Example 1

540 parts of styrene, 60 parts of acrylonitrile and 0.9 part of benzoyl peroxide are dissolved in 900 parts of methanol in a stirring vessel fitted with a thermometer and reflux condenser and 15 parts of a 20% aqueous solution of poly-N-vinyl pyrollidone-2 are added. Through a tube inserted through the reflux condenser, nitrogen or another inert gas is allowed to flow in to displace the air. While stirring continuously, the reaction liquid is heated for 48 hours at 65° C. in an oil-bath, a slight reflux of methanol being observable. After the said period, the original clear liquid has been converted into a mixture of solid polymer, finely dispersed in methanol, which is still capable of being stirred. After cooling it is filtered by suction, rinsed with methanol, and dried at 60° to 80° C.; 497 parts of a copolymer with a nitrogen content of 2.6%, the K-value 80 (corresponding to a molecular weight of 230,000) and a softening point of 99.5° C. are obtained. The product may be worked up by injection molding to transparent, slightly yellow colored shaped articles.

A very similar copolymer is obtained if 2.0 parts of 30% hydrogen peroxide are used as catalyst instead of 0.9 part of benzoyl peroxide.

Example 2

3.6 parts of para-chlorobenzoyl peroxide and 60 parts of a 20% aqueous solution of a coplymer of 98% vinyl pyrrolidone and 2% methyl acrylate are added to a mixture of 1920 parts of styrene, 480 parts of acrylonitrile and 3600 parts of methanol. The clear solution is heated to 65° C. in a stirring vessel fitted with a thermometer and a reflux condenser. In this way the styrene-acrylonitrile copolymer separates in finely divided form without formation of lumps so that the mixture can still be stirred well. The methanol and unreacted monomeric constituents are then removed with steam. After filtration by suction and drying there are obtained 2160 parts of a copolymer with a content of 5.2% of nitrogen, the K-value 84 (corresponding to a molecular weight of 250,000) and a softening point of 103° C. Injection moldings prepared from this copolymer are mechanically very stable, proof against gasoline and transparent. They are colored slightly yellow.

Example 3

438 parts of styrene, 162 parts of acrylonitrile and 1.2 parts of lauroyl peroxide are dissolved in 900 parts of ethanol in the apparatus described in Example 1 and 15 parts of a 20% aqueous solution of polyvinyl pyrrolidone added. The clear solution is then kept boiling for 48 hours in an oilbath under nitrogen while stirring continuously, whereby a white, finely-divided copolymer separates in the form of small globules. After filtration by suction and drying, 450 parts of a product are obtained with a nitrogen content of 6.5%, a K-value of 65 (corresponding to a molecular weight of 150,000) and a softening point of 95° C. It can be worked up by injection molding to clear, transparent, very slightly yellow colored shaped articles which are not attacked by gasoline and have excellent mechanical properties. Instead of ethanol another short chain alcohol such as propanol, isopropanol or butanol can be employed.

Example 4

510 parts of styrene, 90 parts of acrylonitrile, 0.9 part of tertiary-butyl peroxide and 1100 parts of ethylene glycol are introduced into the apparatus described in Example 1. 12 parts of a copolymer of 60% of styrene and 40% of maleic anhydride are added thereto. The mixture is then heated to 90° to 100° C. in an oilbath while it is continually stirred. After a few hours, small white globules form. After 24 hours residual monomeric constituents are removed with steam. After filtration by suction and drying there are obtained 570 parts of a copolymer with a nitrogen content of 3.9%, the K-value 78 (corresponding to a molecular weight of 220,000) and a softening point of 100° C. Injection moldings prepared therefrom are very transparent and have only a slight yellowish color. The glycol can be recovered unchanged from the aqueous filtrate.

Example 5

290 parts of styrene, 110 parts of acrylonitrile and 2 parts of azo-bis-(isobutyronitrile) are dissolved in 1000 parts of methanol in the apparatus described in Example 1 and there are added thereto 20 parts of a 20% aqueous solution of a copolymer of vinyl pyrrolidone and methacrylamide (K-value between 30 and 70) in the ratio of 70:30. The clear solution is heated to the boiling temperature of the methanol for 48 hours while stirring. The styrene-acrylonitrile copolymer thereby separates in the form of finely divided small globules without any lump formation. The methanol is removed and unreacted monomeric constituents are removed, the whole washed with water in order to remove dispersing agent adhering to the particles of copolymer. After filtration by suction and drying there are obtained 362 parts of a copolymer with a content of 7.38% of nitrogen, the K-value 79 (corresponding to a molecular weight of about 225,000) and a softening point of 102.5° C. Injection moldings prepared from this copolymer are mechanically very stable, proof against gasoline and slightly yellowish and transparent.

Example 6

355 parts of styrene, 145 parts of acrylonitrile and 1 part of azo-bis-(isobutyronitrile) are dissolved in 1000 parts of methanol in the apparatus described in Example 1 and 2 parts of a homopolymer of vinyl methyl ether with a K-value of 44 are added until complete solution has taken place. The solution, at first completely clear and homogeneous, is heated at the boiling temperature of the methanol for 48 hours while stirring. The styrene-acrylonitrile copolymer thereby separates in the form of finely divided small globules having a diameter of 0.080 to 0.400 millimetre without coagulated portions. The product is freed by means of steam from methanol, adherent dispersing agent and any monomeric constituents still present. After centrifuging and drying, 475 parts of a copolymer are obtained with a nitrogen content of 7.51%, a K-value of 76 (corresponding to an average molecular weight of about 210,000) and a softening point of 102° C.

Shaped articles, prepared from this material by injection molding methods, have extraordinary mechanical stability, stability to changes in temperature and resistance to fuels. They have a pale yellowish innate color and are completely transparent.

By using a polyvinyl ethyl ether in a corresponding amount instead of the polyvinyl methyl ether described in the above example, copolymers with similar properties are obtained. Instead of the azo-bis-(isobutyronitrile) used here, a series of other azo compounds can be used as polymerization catalysts, as for example para-chlorophenyl-azo-triphenylmethane, para-chlorophenyl-azo-tri-para-tolyl-methane, phenyl-azo - tri-para - anisylmethane, ortho-nitro - phenyl-azo - biphenylmethane, meta-chlorophenyl-azo-tri - phenylmethane, alpha-naphthyl - azo-triphenylmethane and phenyl-azo-triphenylmethane.

Example 7

362 parts of styrene, 64 parts of alpha-methylstyrene and 174 parts of acrylonitrile and 1.2 parts of azo-iso-(isobutyronitrile) are dissolved in 900 parts of methanol in the apparatus described in Example 1 and 6 parts of polyvinyl methyl ether having a K-value of 44 added. The transparent homogeneous solution is stirred for 48 hours at the boiling temperature of the methanol under reflux. The ternary copolymer thereby separates in the form of fine clear globules which, after removal of the methanol and any volatile monomeric constituents still present with steam, can readily be filtered off by suction and dried. 550 parts of a polymer are obtained which can be shaped by injection molding to shaped articles with good mechanical stability, which are practically proof against boiling, which have a high brilliance and only quite a slight yellowish innate color.

Instead of the alpha-methylstyrene used above, alpha-chlorstyrene and nuclear-methylated styrene can be used with success.

Example 8

426 parts of styrene and 174 parts of acrylonitrile are dissolved in 900 parts of methanol to form a homogeneous transparent solution, 12 parts of polyvinyl methyl ether, 2 parts of lauroyl peroxide and 12 parts of butyl stearate (lubricant) are added and the mixture is kept under reflux at the boiling temperature of the methanol for 48 hours while stirring. The copolymer is thereby precipitated in the form of entirely clear globules without coagulated constituents. After the polymerization, the methanol and any volatile monomeric constituents still present are driven off with steam, and any adherent dispersing agent is washed out with water. After centrifuging and drying, 560 parts of a polymer are obtained which as compared with a product without the addition of lubricant has a much better flowability and can therefore be worked up into high quality, scarcely yellowish shaped articles at lower injection molding temperatures.

Instead of butyl stearate other lubricants such as diethylene glycol monomethyl ether or fatty alcohols, such as lauryl alcohol or stearyl alcohol may be used.

We claim:

1. A method of manufacturing a homogeneous, transparent copolymer of a styrene compound and acrylonitrile which comprises preparing a homogeneous solution of 5–50% by weight of polymerizable constituents composed of 50–90% by weight of a styrene compound selected from the group consisting of styrene, alpha-methyl styrene, alpha-chloro-substituted styrene and nuclear methylated styrene and 50–10% by weight of acrylonitrile, the percentages of the styrene compound and acrylonitrile being based on the total weight of these two polymerizable compounds, in a saturated alcohol having 1–4 carbons, which alcohol is miscible with water and in which alcohol the formed copolymers of said styrene compound and acrylonitrile are insoluble, said alcohol containing 0.05%–2% by weight, based on the total weight of said styrene compound and acrylonitrile, of an organic protective colloid which is a film-forming, high molecular weight polymer selected from the group consisting of homopolymers and copolymers of monoethylenically unsaturated monomers, said polymer being soluble in said alcohol and having a K-value between 30 and 100, and copolymerizing the styrene compound and the acrylonitrile while agitating the reaction mixture.

2. A method as claimed in claim 1 wherein the polymerization is catalyzed by 0.05–2% by weight, based on the total weight of said styrene compound and acrylonitrile, of a free radical polymerization catalyst.

3. A method as claimed in claim 1 wherein methanol is the alcohol.

4. A method as claimed in claim 1 wherein ethylene glycol is the alcohol.

5. A method of manufacturing a homogeneous, transparent copolymer of styrene and acrylonitrile which comprises preparing a homogeneous solution of 5–50% by weight of polymerizable constituents composed of 60–80% by weight of styrene and 40–20% by weight of acrylonitrile, the percentages of styrene and acrylonitrile being based on the total weight of these two polymerizable compounds, in a saturated alcohol having 1–4 carbons, which alcohol is miscible with water and in which alcohol the formed copolymers of styrene and acrylonitrile are insoluble, said alcohol containing 0.05–2% by weight based on the total weight of said styrene and acrylonitrile, of an organic, protective colloid which is a film-forming, high molecular weight polymer selected from the group consisting of homopolymers and copolymers of monoethylenically unsaturated monomers, said polymer being soluble in said alcohol and having a K-value between 30 and 100, and copolymerizing the styrene and acrylonitrile in the presence of 0.05–2% by weight of a free radical polymerization catalyst while agitating the reaction mixture.

6. A method as claimed in claim 5 wherein poly-N-vinyl-pyrrolidone-2 is the organic protective colloid.

7. A method as claimed in claim 5 wherein a polyvinyl lower alkyl ether is the protective colloid.

8. A method as claimed in claim 5 wherein polyvinyl methyl ether is the protective colloid.

References Cited in the file of this patent

UNITED STATES PATENTS

| | | |
|---|---|---|
| 1,933,052 | Fikentscher et al. | Oct. 31, 1933 |
| 2,133,257 | Strain | Oct. 11, 1938 |
| 2,436,926 | Jacobson | Mar. 2, 1948 |
| 2,543,306 | Staudinger | Feb. 27, 1951 |
| 2,643,995 | Park | June 30, 1953 |
| 2,741,652 | Miller | Apr. 10, 1956 |

OTHER REFERENCES

Schildknecht: "Vinyl and Related Polymers," John Wiley & Sons, Inc., New York, 1952, page 15.

Arnett: J. Am. Chem. Soc., volume 74, page 2027.